J. L. PARKER.
MOWING MACHINE.
APPLICATION FILED NOV. 27, 1911.
1,117,515.
Patented Nov. 17, 1914.
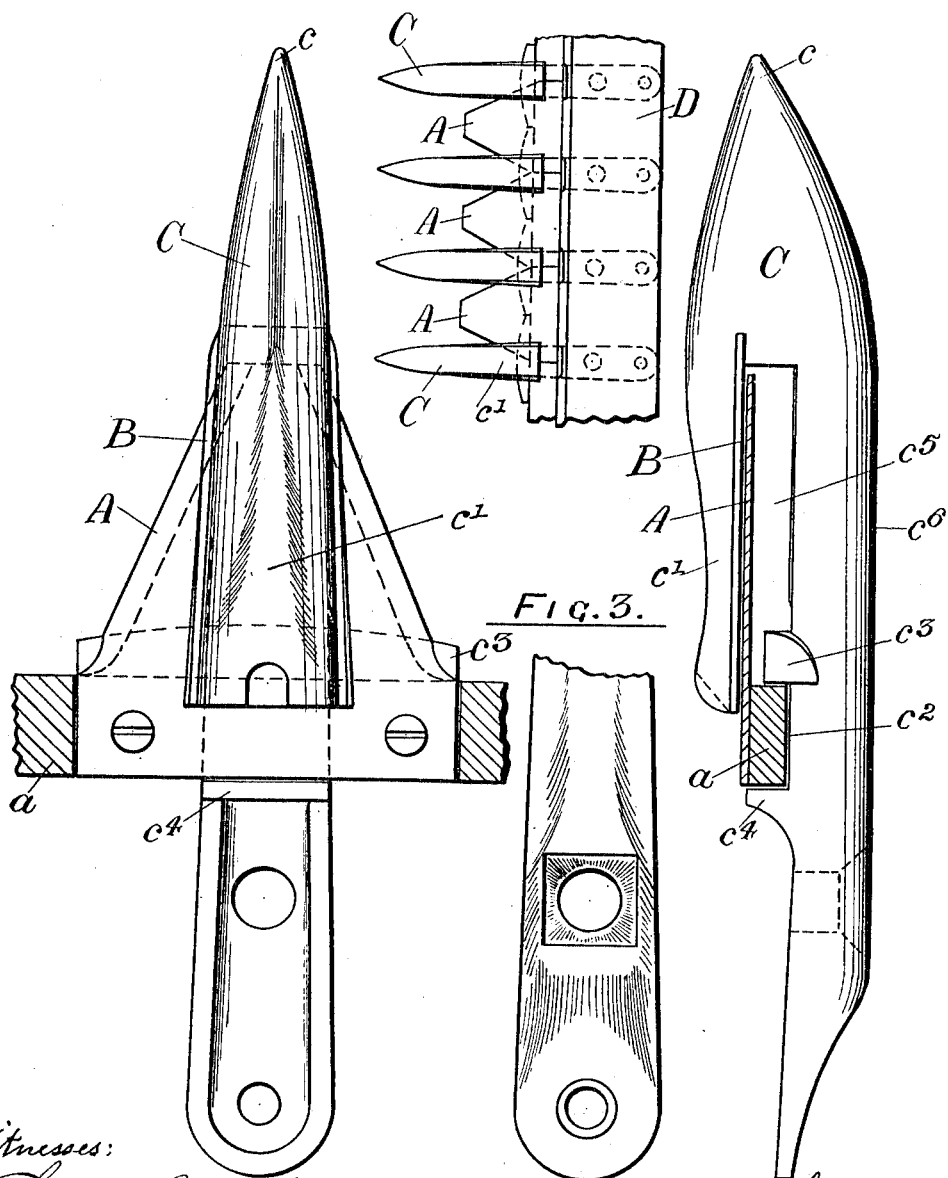

UNITED STATES PATENT OFFICE.

JOHN LITTLEDALE PARKER, OF GALGATE, LANCASTER, ENGLAND.

MOWING-MACHINE.

1,117,515.  Specification of Letters Patent.  Patented Nov. 17, 1914.

Application filed November 27, 1911. Serial No. 662,684.

*To all whom it may concern:*

Be it known that I, JOHN LITTLEDALE PARKER, a subject of the King of Great Britain, residing at Ashley House, Galgate, Lancaster, in the county of Lancaster, England, have invented certain new and useful Improvements in Mowing-Machines, of which the following is a specification.

This invention relates to mowing machines for cutting grass, corn and the like and to that type of machine in which the cutting operation is effected by a reciprocating knife or cutter bar, the V-shaped blades of which are moved to and fro between the fingers of the usual finger bar. In machines of this class the knives or cutters have been moved over the upper surfaces of fixed shearing plates, or over the upper surface of a fixed shearing bar carried by the finger bar and it has been found in practice that the pressure of the material under operation forces the knife blades away from the fixed plates or bar with the result that the cutting operation is detrimentally affected and the knives are liable to become bent. With a view to overcoming this objection clips have been employed for the purpose of retaining the knife blades in close contact with the fixed shearing plates or bar, but even with this arrangement the portions of the blades which project beyond the clips become bent and forced away from the aforesaid plates or bar.

According to this invention the knife blades are situated underneath the fixed shearing plates or bar and are retained in contact therewith by the pressure of the material under operation. By this arrangement cleaner cutting is obtained, the aforesaid clips are dispensed with, the knife blades remain flat and are self sharpening by reason of their frictional contact under pressure with the fixed shearing plates or bar.

In the accompanying drawings:—Figure 1, is a plan of part of a knife and finger constructed and arranged in accordance with this invention. Fig. 2, is a side elevation of the finger showing the knife in section. Fig. 3, is an inverted plan of part of the finger. Fig. 4, is a plan of a portion of the finger bar together with the fingers and knife blades.

A, A, indicate the knife blades, B, B the fixed shearing plates, C, C the fingers, and D indicates the finger bar.

In the example shown in Figs. 1 to 4, the fingers C are fixed to the underside of the finger bar D and terminate at their forward ends in points $c$ which incline slightly in an upward direction as shown in Fig. 2 to facilitate their passage through the material under operation. The upper surfaces of the fingers are formed with tongues $c^1$ and to the under surfaces of the latter are secured the fixed plates B. The knife blades A are situated below the shearing plates B and are screwed or otherwise attached to a reciprocating knife bar $a$ which is slidably mounted in a recess $c^2$ formed in each of the fingers C betwen lugs or projections $c^3$ $c^4$ thereon. The forward or cutting portion of the knife blade works in a recess or clearance space $c^5$ formed between the tongue $c^1$ and the lower portion $c^6$ of the finger.

By the arrangement described, the pressure of the grass or other material under operation against the underside of the knife blades forces the latter in an upward direction and retains their clutting edges in close contact with the fixed shearing plates thereby insuring clean cutting, the said plates acting as guides or supports which prevent the blades from becoming bent or strained and the frictional contact under pressure of the blades with the plates exerts a sharpening effect upon the blades which tends to retain the same in good cutting condition.

The type of finger shown in the figures under consideration affords a large clearance space $c^5$ which does not become clogged up during the working of the machine, and the portion $c^6$ effectually protects the knife blade from the ground or soil.

What I claim as my invention and desire to secure by Letters Patent of the United States, is:—

In a mowing machine, a guard finger provided with a lower main portion adapted to slide in contact with the ground, and having two integrally formed lugs at its middle part which form a guide or channel for the reception of the knife bar, and a tongue projecting rearwardly from the upper part of
5 the front end of the finger to a point between the aforesaid lugs and having a shearing plate on its under surface.

In testimony whereof I affix my signature in presence of two witnesses.

JOHN LITTLEDALE PARKER.

Witnesses:
 ESNOLD SIMPSON MOSELEY,
 MALCOLM SMETHURST.

Copies of this patent may be obtained for five cents each, by addressing the "Commissioner of Patents, Washington, D. C."